US008245519B1

(12) United States Patent
Liang

(10) Patent No.: US 8,245,519 B1
(45) Date of Patent: Aug. 21, 2012

(54) LASER SHAPED FILM COOLING HOLE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 880 days.

(21) Appl. No.: 12/277,586

(22) Filed: Nov. 25, 2008

(51) Int. Cl.
*F02C 7/12* (2006.01)

(52) U.S. Cl. ............ 60/806; 60/752; 415/115; 416/96 R

(58) Field of Classification Search .................... 60/806, 60/752; 415/115, 116; 416/96 A, 96 R, 97 A, 416/97 R
See application file for complete search history.

(56) References Cited

U.S. PATENT DOCUMENTS 4,664,597 A 5/1987 Auxier et al.
4,684,323 A 8/1987 Field
5,181,379 A * 1/1993 Wakeman et al. .............. 60/766
6,183,199 B1 2/2001 Beeck et al.
7,246,992 B2 7/2007 Lee
7,328,580 B2 2/2008 Lee et al.
7,374,401 B2 5/2008 Lee
8,057,181 B1 * 11/2011 Liang .......................... 416/97 R
8,066,484 B1 * 11/2011 Liang .......................... 416/97 R
2010/0143132 A1 * 6/2010 Spangler ......................... 416/95

* cited by examiner

*Primary Examiner* — Phutthiwat Wongwian
(74) *Attorney, Agent, or Firm* — John Ryznic

(57) ABSTRACT

A film cooling hole for an air cooled turbine airfoil, the film cooling hole including an inlet metering section and a diffusion section that opens onto a surface of the airfoil and has a bean shaped cross section. The diffusion section has a 10×10×10 expansion on the side walls and the downstream wall, and the sides are smoothly and continuously contoured to be without sharp corners. The bottom wall includes a convex middle portion and two concave outer end portions that have the same radius of curvatures. The shape of the film cooling hole allows for the hole to be formed from a laser beam cutting process instead of the EDM electrode process. Because of the larger zones formed in the sides, vortex flow formation under the film stream is minimized to produce a more effective film with lower shear mixing of the hot gas vortices with the cooling air.

9 Claims, 4 Drawing Sheets

LASER SHAPED FILM COOLING HOLE

FEDERAL RESEARCH STATEMENT

None.

CROSS-REFERENCE TO RELATED APPLICATIONS

None.

BACKGROUND OF THE INVENTION

1. Field of the Invention

The present invention relates generally to an air cooled turbine airfoil, and more specifically to a shaped film cooling hole in the airfoil.

2. Description of the Related Art Including Information Disclosed Under 37 CFR 1.97 and 1.98

A gas turbine engine includes a turbine with multiple stages of stator vanes and rotor blades that react with a hot gas flow to drive the engine and produce power. The turbine airfoils are exposed to such high temperatures that thermal damage would occur if not for the application of internal and external cooling air. The cooling of airfoils includes convection cooling, impingement cooling and film cooling in the airfoils exposed to the highest temperatures such as the first stage and even second stage airfoils.

Film cooling is produced by discharging the pressurized cooling air from the internal cooling passages onto the airfoil external surface. This creates a protective layer of film air to protect the metal airfoil surface from the hot gas flow. Prior art film holes include the straight circular entrance region having a constant diameter followed by a single conical diffusion section that opens onto the airfoil surface. The constant cross section entrance region is used for metering the cooling air flow through the film hole. The conical diffusion section is used for reducing the cooling air momentum or exit velocity of the air. If the air flow is discharged at too high of a velocity or at too high of an angle with respect to the airfoil surface, no film layer will develop.

Normally, an expansion area ratio of 2 to 6 times the metering section area is used in the airfoil film hole cooling design. This type of film cooling hole construction can be found in most of the prior art turbine airfoil cooling designs. FIG. 1 shows the prior art Vehr hole with a standard 10×10×10 shaped diffusion hole that is widely used in the current cooling designs for airfoils. See U.S. Pat. No. 4,653,983 issued to Vehr on Mar. 31, 1987 and entitled CROSS-FLOW FILM COOLING PASSAGES. The diffusion section has a 10 degree spanwise expansion in both the two side walls and the downstream expansion, while the upstream wall is straight and without an expansion. An expansion in the upstream direction will entrain hot gas into the film cooling hole at the exit plane as indicated by point A in FIG. 3. As a result, the entrainment causes shear mixing with the ejected cooling air and a degradation of the film effectiveness level. The 10×10×10 shaped diffusion holes are currently produced by the well-known EDM or electro-discharge machining process. FIG. 1 shows a cross sectional view of the hole, FIG. 2 shows a top view, and FIG. 3 shows a gun barrel view of the hole. FIG. 4 shows the EDM electrode that is used to produce the film cooling hole. As indicated from the top view of FIG. 2, the foot print is in the trapezoidal shape with four sidewalls. The same geometric shape is shown for the gun barrel view in FIG. 3. The metering hole circle is tangent to the upper or upstream side wall of the trapezoid.

As the TBC (thermal barrier coatings) technology improves, industrial gas turbine (IGT) airfoils can be applied with a thicker TBC. Machining film cooling holes using the EDM process becomes less cost effective. Since the TBC material is a non-conducting material (typically a ceramic), the electrode will not be able to cut through the TBC material to form the holes. Film cooling holes must be machined before the TBC can be applied. Thus, masking of the film cooling holes is required before the TBC can be applied. Then, the masking material is removed to leave the open holes in the TBC. This is a very costly and highly laborious process to form an airfoil with a TBC and film cooling holes.

BRIEF SUMMARY OF THE INVENTION

It is an object of the present invention to provide for a film cooling hole in a turbine airfoil that can be formed by a laser.

It is another object of the present invention to provide for a turbine airfoil with a film cooling hole that can be formed after the TBC has been applied and without requiring masking.

It is another object of the present invention to provide for a turbine airfoil with a film cooling hole that can be manufactured at a lower cost than the cited prior art film cooling holes.

It is another object of the present invention to provide for a turbine airfoil with a film cooling hole that that will lower the metal temperature of the airfoil wall than the cited prior art film cooling holes.

It is another object of the present invention to provide for a turbine airfoil with a film cooling hole that that will reduce the cooling flow requirement of the airfoil wall than the cited prior art film cooling holes.

A laser machined film cooling hole with a 10×10×10 expansion to produce an effective film layer on an airfoil surface, the laser film cooling hole being formed without sharp corners and having an inlet section forming a metering section followed by a diffusion section having the 10×10×10 expansion on the sidewalls and the downstream wall, and with a hole opening having a footprint on the airfoil surface of a bean shaped cross section. The diffusion section has smooth continuous rounded corners with a raised bump like section in the middle of the downstream wall so that two trenches are formed on the outer sides of the downstream wall for the purpose of spreading out the film cooling air to the sides to minimize the vortices formation under the film stream at the injection location. The smooth contours of the diffusion section allows for easier laser machining and also eliminates sharp corners that increase stress concentration factors and limit the life of the airfoil.

The film cooling hole uses laser shaping to form a bean shaped hole with a flat top without expansion and also a continuous smooth internal contour for both corners and bottom surface. A bean shaped entrance region followed by a bean shaped diffusion section is used for the construction of the laser machined shaped film cooling hole. The aspect ration—ratio of major axis length to minor axis length—for both the metering section and the diffusion section are the same. This is dramatically different from the hole shape produced by the EDM process with the electrode. The basic principle for the metering diffusion hole remains the same. The film cooling hole with a smooth internal side wall; contour eliminates the sharp corner for the cooling hole at the exit plane and makes for easier laser machining. The limitation of sharp corners reduces the stress concentration factor and improves the life of the part.

DETAILED DESCRIPTION OF THE INVENTION

Figure 1:
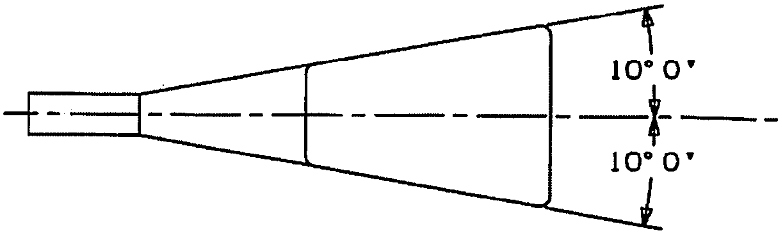
Fig 1 Prior Art
FIG. 1 shows a cross section top view of a prior art 10×10×10 film cooling hole.
Figure 2:
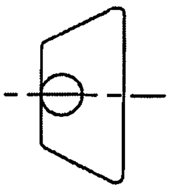
Fig 2 Prior Art
FIG. 2 shows a gun barrel view of the prior art film cooling hole of FIG. 1.
Figure 3:
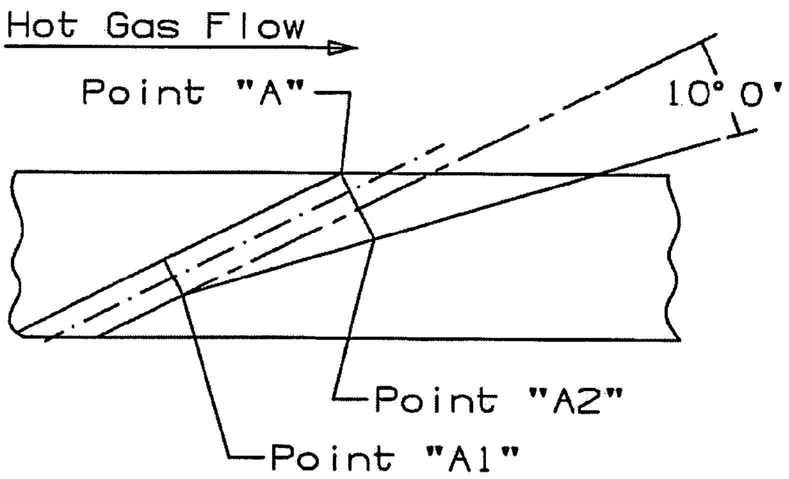
Fig 3 Prior Art
FIG. 3 shows a cross section side view of the prior art film cooling hole of FIG. 1.
Figure 4:
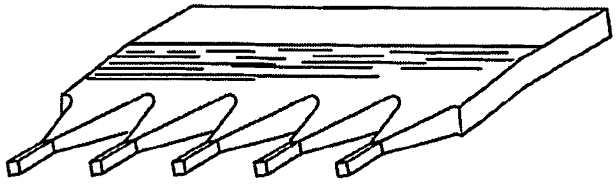
Fig 4 Prior Art
FIG. 4 shows a schematic view of a prior art electrode used to form the prior art film cooling hole of FIG. 1 using the EDM process.
Figures 5, 6:
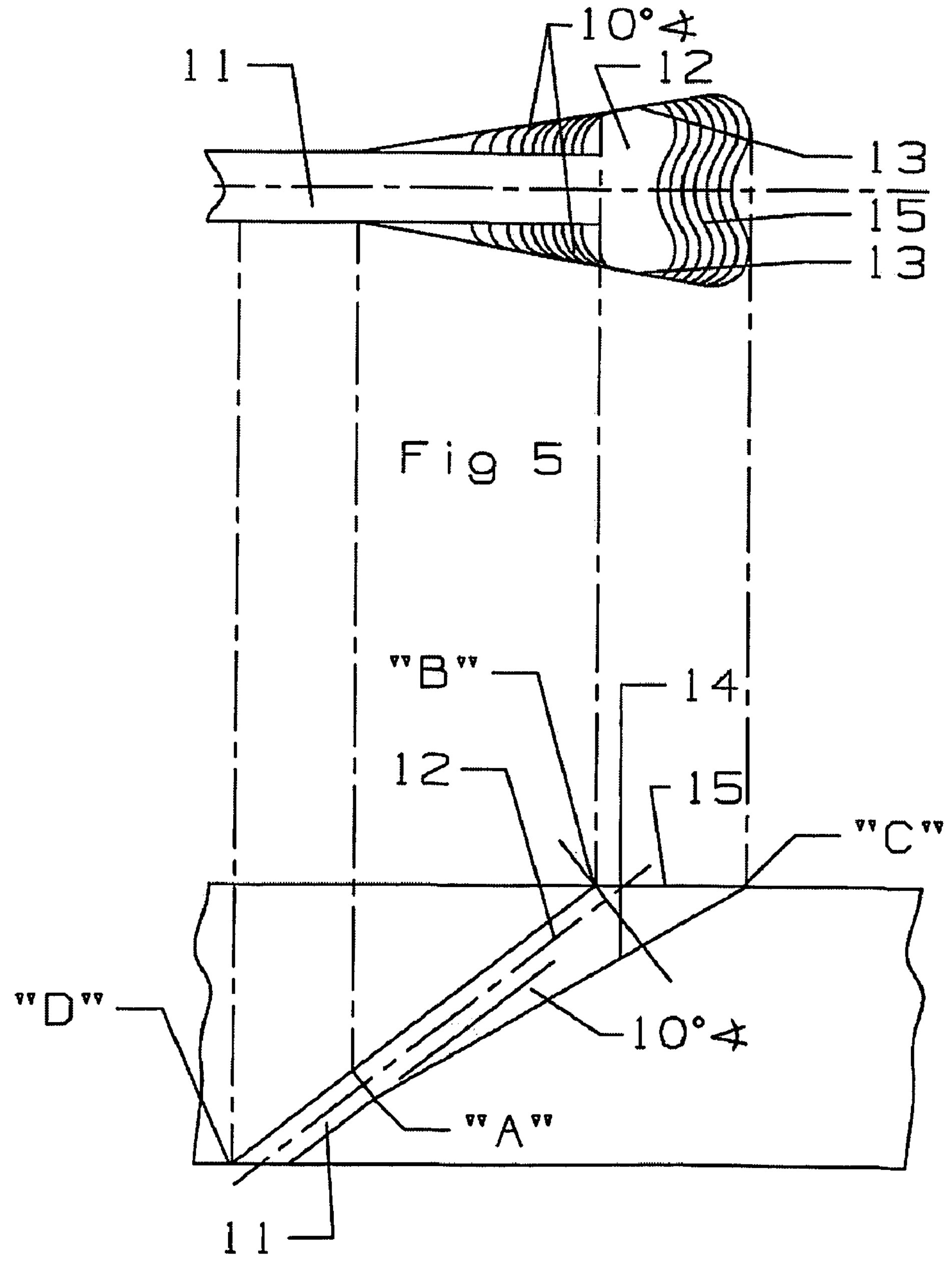
FIG. 5 shows a cross section top view of the film cooling hole of the present invention.
FIG. 6 shows a cross section side view of the film cooling hole of the present invention.

The film cooling hole of the present invention is for use in an air cooled turbine airfoil such as a stator vane or a rotor blade of a gas turbine engine. However, the film cooling hole could be used in other devices that require a layer of film cooling air to protect the outer surface from a hot gas flow such as combustor liners. The film cooling hole 10 of the present invention is shown in FIGS. 5 through 8 where in FIG. 5 shows a top cross section of the hole and includes an inlet or metering section 11 having a constant diameter followed by the diffusion section 12 that has a bean shaped cross section. By bean shape, this disclosure defines as a substantially flat upper side, two substantially flat sides that are wider at the bottom, and a waving bottom side having a raised idle portion and two lower portions on the sides, and where all four sides have a continuous and smooth contour where the sides join.

FIG. 6 shows a cross section side view of the film cooling hole 10 of FIG. 5, where the hole includes the metering inlet section 11 with the minor axis represented by the dashed line. The diffusion section 12 has an upstream or top wall that is without any expansion so that the top wall is a straight continuation of the top wall of the metering section and parallel to the minor axis. The downstream or bottom wall of the diffusion section has a 10 degree expansion. As seen in FIG. 5, the two side walls of the diffusion section also have a 10 degree expansion. The hole has an opening 15 onto the airfoil surface and has the cross section seen in FIG. 5.

Figure 7:
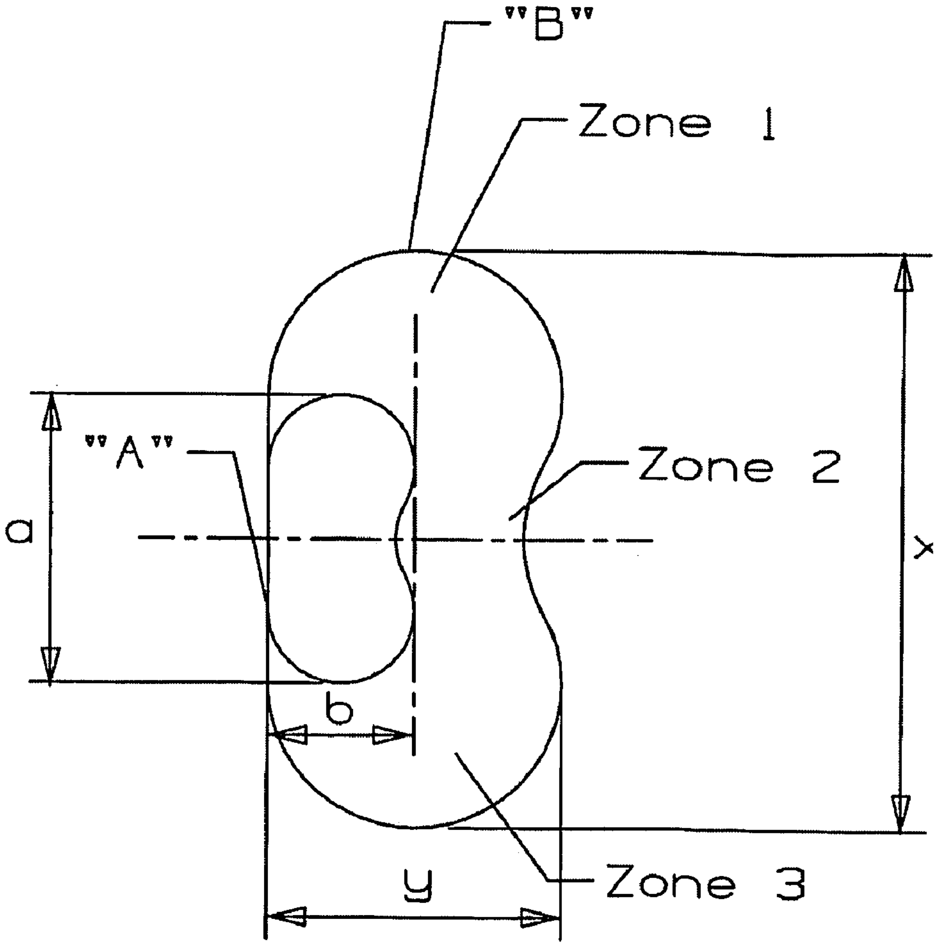
FIG. 7 shows an enlarged view of the bean shaped diffusion hole from a gun barrel view angle of the present invention.

FIG. 7 shows the shape of the diffusion hole looking down the hole in the gun barrel view which is in line with the central axis. Label A shows the diffusion hole where the metering section ends and the diffusion section begins (also see FIG. 6) and has a flat top, rounded sides, and a convex middle section and two concave side sections, and where all the sections merge in a continuous and smooth transition to eliminate sharp corners. Label B is where the top wall of the diffusion section ends on the airfoil surface and is shown in FIG. 6 as B. in FIG. 7, the diffusion hole at position B has a cross sectional shape shown as B in this figure and has a similar shape as A but larger. The top sides of A and B are along the same plane due to the top wall of the diffusion section having no expansion. As seen in FIG. 7, the diffusion section has three zones and includes zone 1, zone 2 and zone 3. The minor axis is shown as y and the major axis is shown as x. both cross sectional shapes A and B have bean shapes. The diameter of the smaller holes in shape A is 'b', and the two diameters of the smaller holes in shape A is "a'. The dimensions of "a" and "b" along with x and y define the aspect ratio in which a/b is equal to x/y for the diffusion hole of the present invention.

Figure 8:
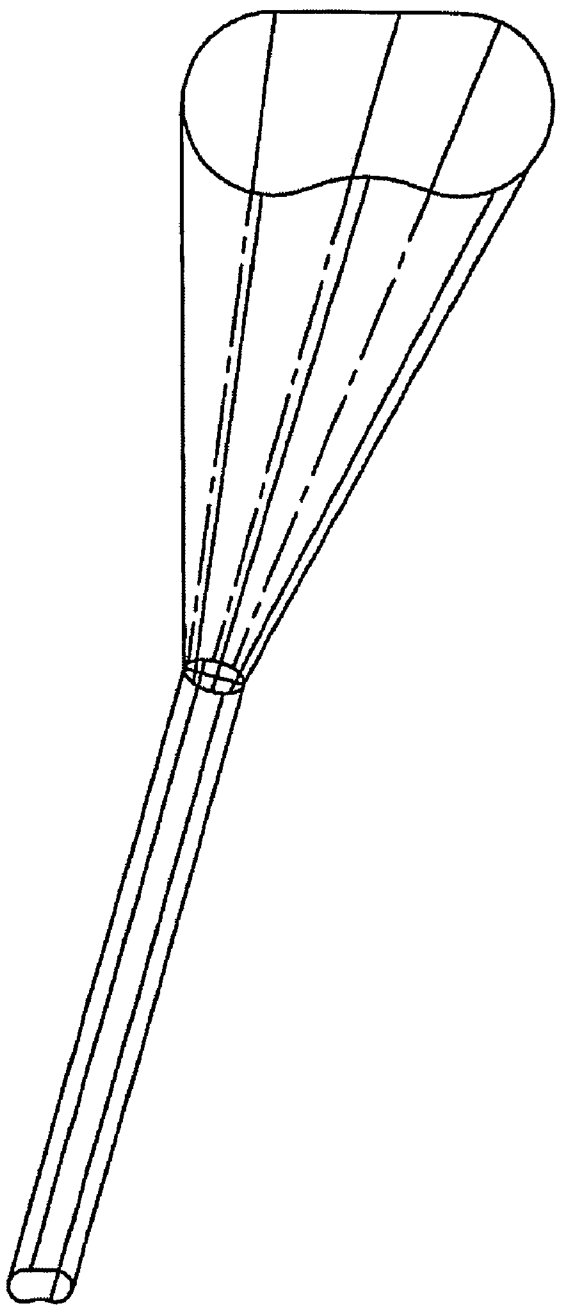
FIG. 8 shows a schematic view of the bean shaped diffusion hole of the present invention.

FIG. 8 shows a schematic view of the film cooling hole 10 of the present invention with the metering section 11 followed by the diffusion section 12 having the bean shaped opening 15. the diffusion section 12 goes from a circular cross sectional shape at the end of the metering section to the bean shaped cross sectional shape at the hole opening 15. The hole opening 15 also represents the path that the laser travels to form the film hole.

Thus, the film cooling hole of the present invention can formed using a laser machining process to eliminate the problems formed by the EDM process using the electrode of the prior art. However, using the laser machining process to produce a cooling hole shape and foot print normally produced by the EDM process will incur several constraints on the use of a laser machining process, especially when the film cooling hole contains sharp corners.

In the film cooling hole of the present invention, a bean shaped entrance region is followed by a bean shaped diffusion section in order to be easily formed by the laser machining process. The aspect ration—the ratio of the major axis length over the minor axis length—(x/y) for both the metering section 11 (a/b) and the diffusion section 12 (x/y) are the same. This is a major difference from the film cooling hole shape produced by the EDM process of the prior art. The basic principle for the metering diffusion hole remains the same with a 10×10×10 expansion on the two side walls and the downstream wall. The cooling hole with a smooth internal side wall contour eliminates the sharp corner for the cooling hole at the exit plane that is produced in the prior art EDM hole and allows for easier machining using the laser process. The elimination of sharp corners reduces the stress concentration factor and improves the life of the part.

The gun barrel view of FIG. 7 presents a larger view of the diffusion section 12. The inlet section (A) and the outlet section or the most downstream portion of the diffusion section (B) of the diffusion hole is divided into three zones. Each zone for the inlet section corresponds to a zone on the exit section. Since there is no expansion for the upstream wall and the minor axis for both metering hole and expansion section are aligned, the contour for the upstream surface of the diffusion section is formed by an in-plane extension for the metering section of the metering flat intersection with the semi-cone section. Both semi-circular sections will be formed with a 10 degree outward expansion. The downstream surface is expanded along the plane surface cut through the A, C and D in FIG. 6. With the intersection of both semi-circular cone sections. The expansion angle for the downstream surface is limited by the 10 degree angle and the length of the metering section 11. The laser beam will cut through the exit plane path and the inlet plane path forming a bean shaped diffuser cavity.

During the manufacturing process, the laser beam is trepanning the film hole metering section first. This is done by rotating the laser beam to follow the contour of the metering bean shaped geometry around the metering hole axis. As a result, a bean shaped hole is cut through the diffusion section and the metering section. Subsequently, the laser beam will trepanning around the contours in-between the exit plane and the inlet circle with an angle of 10 degrees skew from the metering hole centerline to form a three dimensional (3D) envelope cut by the laser beam. FIG. 8 shows the outline of a solid envelope cut by a laser trepan manufacture process for a 10×10×10 expansion angle bean shaped film hole. With this manufacturing process, a bean shaped diffusion hole can be created easily. A very smooth corner with a transition to a concave diffusion surface at the downstream expansion surface is generated.

The concave surfaces on the sides of the convex surface in the middle will force the ejected film flow more toward the corners and thus minimize the formation of vortices under the film stream at the injection location. Higher film effectiveness is generated by the lower shear mixing of hot gas vortices with cooling air. A potentially good film layer can then be generated on the blade surface by this concave expansion geometry.

The invention claimed is:

1. A film cooling hole for providing a film cooling air to an air cooled part comprising:

- an inlet metering section having a constant diameter;
- a diffusion section located downstream from the inlet metering section;
- the diffusion section having an expansion of around 10 degrees in two opposite side walls from an inlet to an outlet to provide the film cooling air to the air cooled part;
- the diffusion section having a cross sectional shape with a bottom wall having a convex shaped middle portion and the two opposite side walls, each having a concave shaped side portion; and,
- four sides of the diffusion section cross sectional shape having a smooth continuous contour for all of corners such that sharp corners are not used.

2. The film cooling hole of claim 1, and further comprising: an upstream wall of the diffusion section has zero expansion.

3. The film cooling hole of claim 1, and further comprising:

- the film cooling hole is formed by a laser beam and not an EDM process.

4. The film cooling hole of claim 1, and further comprising:

- a cross sectional shape of the diffusion hole at the inlet is the same as the cross sectional shape at the most downstream end.

5. The film cooling hole of claim 1, and further comprising:

- a radius of curvature of the convex portion for each of the two opposite side walls is equal to the radius of curvature of the concave portion of the bottom wall of the diffusion section.

6. The film cooling hole of claim 1, and further comprising:

- a cross sectional shape of the diffusion hole is the same from the inlet end to the downstream end.

7. The air cooled part for use in a gas turbine engine, comprising:

- a plurality of film cooling holes of claim 1 to provide a layer of film cooling air onto a surface of the air cooled part.

8. The air cooled part of claim 7, and further comprising: the air cooled part is an airfoil used in a turbine section.

9. The air cooled part of claim 7, and further comprising:

- The air cooled part is a wall of a combustor used in the gas turbine engine.

* * * * *